United States Patent [19]

Ikeno et al.

[11] Patent Number: 4,907,025
[45] Date of Patent: Mar. 6, 1990

[54] AUTOMATIC FOCUSING CAMERA

[75] Inventors: Tomohisa Ikeno, Tokyo; Hideya Inoue, Yokohama, both of Japan

[73] Assignee: Nikon Corporation, Tokyo, Japan

[21] Appl. No.: 304,889

[22] Filed: Jan. 31, 1989

Related U.S. Application Data

[63] Continuation of Ser. No. 95,310, Sep. 11, 1987, abandoned.

[30] Foreign Application Priority Data

Oct. 27, 1986 [JP] Japan .................. 61-164676[U]

[51] Int. Cl.⁴ .................................................. G03B 3/00
[52] U.S. Cl. .................................... 354/400; 354/486
[58] Field of Search ........................ 354/400–409, 354/266, 268, 484, 486, 412

[56] References Cited

U.S. PATENT DOCUMENTS 4,295,715 10/1981 Breen .................................. 354/486
4,445,767 5/1984 Kawazoe ............................ 354/266
4,474,447 10/1984 Kawabata et al. ................ 354/409

FOREIGN PATENT DOCUMENTS 60-41331 9/1985 Japan .

Primary Examiner—L. T. Hix
Assistant Examiner—David M. Gray
Attorney, Agent, or Firm—Shapiro and Shapiro

[57] ABSTRACT

A camera has automatic focusing modes which can be switched upon operation of the release button. When the release button is depressed by a first operation, a photographing operation is performed in the focusing priority mode, that is, it is performed after the photographing lens is moved to an in-focus position. When the release button is depressed by a second operation after the first operation, the photographing operation is performed in the photographing priority mode, that is, the photographing operation is immediately performed without waiting until the photographing lens is moved to the in-focus position.

11 Claims, 6 Drawing Sheets

AUTOMATIC FOCUSING CAMERA

This is a continuation application of Ser. No. 095,310, filed Sept. 11, 1987, now abandoned.

BACKGROUND OF THE INVENTION

1. Field of the Invention

The present invention relates to a camera having an automatic focusing means which can be driven to focus a photographing lens on an object and a photographing means for photographing the object upon depression of a release button.

2. Related Background Art

In cameras of this type, a camera which can select two automatic focusing modes, as described in Japanese Patent Publication (examined) No. 41331/1985 (Japanese Patent Publication (unexamined) No. 1024/1981), is known.

A first automatic focusing mode is a focusing priority mode. In this mode, as long as a photographing lens is not moved to position at which the photographing lens is focused on an object (to be referred to as an in-focus position hereinafter) by the automatic focusing means, the operation of the photographing means responsive to the depression of the release button is inhibited. In the photographing operation in this mode, a focusing error can be prevented.

A second automatic focusing mode is a photographing priority mode. In this mode, even if the photographing lens has not yet reached the in-focus position, the operation of the photographing means is allowed upon depression of the release button. In the photographing operation in this mode, a photographing opportunity is not lost.

The selection of the above-mentioned automatic focusing modes is achieved by a switching operation of a special-purpose actuator.

In the conventional automatic focusing camera, a user must confirm the currently selected mode, and must check whether the currently selected mode is suitable for an object to be photographed. If the camera is used in a wrong mode without this check, the user may lose a good photographing opportunity. For example, if an object moves unreproducibly, the photographing operation should be carried out despite a slight defocus state. Therefore, the photographing priority mode must be selected. However, in this case, when the focusing priority mode is erroneously selected, even if the release button is immediately depressed at a good photographing opportunity, the photographing operation is inhibited in the defocus state, and the opportunity is lost.

If the kind of objects to be photographed changes frequently among still lifes and moving bodies, the automatic focusing modes should be frequently switched depending on an object to be photographed. However, the camera is usually used continuously in either mode due to the cumbersome switching operation.

SUMMARY OF THE INVENTION

It is an object of the present invention to provide a camera which is free from the conventional drawbacks, can prevent a photographing error, and can be easily operated.

In order to achieve the above object, in a camera of the present invention, the automatic focusing modes can be switched upon operation of the release button. More specifically, when the release button is depressed by a first operation (e.g., depression by a first stroke), the photographing operation is performed in the focusing priority mode, that is, it is performed after the photographing lens is moved to an in-focus position. When the release button is depressed by a second operation after the first operation (e.g., depression by a second stroke longer than the first stroke), the photographing operation is performed in the photographing priority mode, that is, the photographing operation is immediately performed without waiting until the photographing lens is moved to the in-focus position.

According to an automatic focusing camera with the above structure of the present invention, a user need only arbitrarily change the stroke of the release button, so that the automatic focusing modes can be quickly switched. The switching operation can be reliably performed immediately before the photographing operation. If an object is a still object suitable for the focusing priority mode, the release button is depressed by the first operation to allow the strictly in-focus photographing operation. If an object is a moving body suitable for the photographing priority mode and a photographing opportunity comes, the release button is depressed by the second operation after the first operation, and a photograph can be reliably assured.

DETAILED DESCRIPTION OF THE PREFERRED EMBODIMENTS

Figure 1:
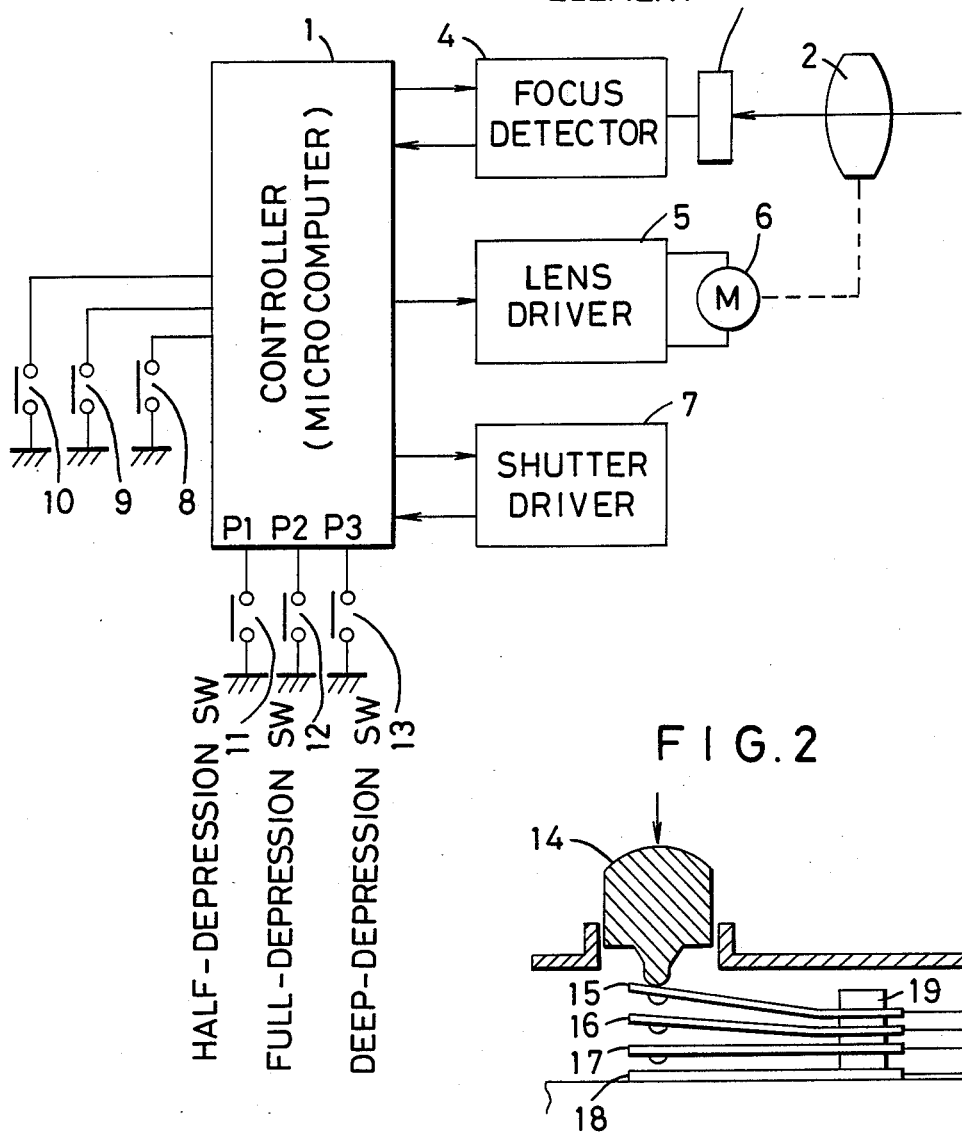
FIG. 1 is a block diagram showing an embodiment of the present invention.

FIG. 1 is a block diagram showing an embodiment in which the present invention is applied to a still camera using a photosensitive film.

The arrangement will first be described. A controller 1 using a microcomputer is connected to a focus detector 4. The focus detector 4 detects a defocus state of an object based on a light-receiving output from a distance-measurement element 3 using a CCD line sensor which receives an object image obtained through a photographing lens 2 and converts it into an electrical signal.

The controller 1 is connected to a lens driver 5. A lens drive motor 6 is operated based on a defocus signal obtained from the focus detector 4 to move focusing lenses in the photographing lens 2, thereby performing focusing.

The controller 1 is also connected to a shutter driver 7. When a release button is depressed in either a focusing or photographing priority mode and a predetermined photographing condition is established based on the type of the operation, a shutter release operation is performed, that is, front and rear curtains are driven. Then, a film wind-up operation is performed after the shutter release operation.

The distance-measurement element 3, the focus detector 4, the lens driver 5, and the lens drive motor constitute an automatic focusing (AF) means for moving the photographing lens 2 to an in-focus position so as to follow the movement of an object. The focus detector 4 also serves as a means for generating an in-focus signal when the lens 2 is moved to the in-focus position. The shutter driver 7 constitutes a photographing means for performing various operations necessary for photographing the object.

The controller 1 is also connected to a power switch 8, an AF lock switch 9, and a mode switch 10. The power switch 8 can be independently arranged or can be a switch which is turned on upon half-depression of the shutter release button. The AF lock switch 9 can interrupt lens servo, i.e., the operation of the lens drive motor 6 by the lens driver 5 in either the focusing or photographing priority mode. The mode switch 10 is adopted to select the focusing or photographing priority mode, and may be arranged to select a manual mode for a manual focusing operation.

The controller 1 is also connected to a half-depression switch 11, a full-depression switch 12, and a deep-depression switch 13 which are operated stepwise upon depression of the release button.

The half-depression switch 11 serves as a first signal generation means for generating a first signal. The full-depression switch 12 serves as a second signal generation means for generating a second signal upon first operation of the release button. The deep-depression switch 13 serves as a third signal generation means for generating a third signal upon second operation of the release switch after the first operation.

Figure 2:
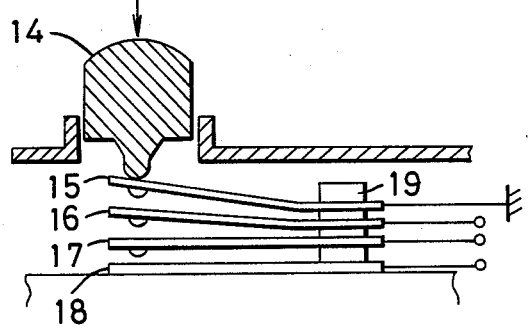
FIG. 2 is a sectional view for explaining an embodiment of the detailed structure of half-, full- and deep-depression switches shown in FIG. 1.

The integral structure of the switches 11, 12, and 13 is as shown in the sectional view of FIG. 2.

Referring to FIG. 2, four metal segments 15, 16, 17, and 18 are arranged immediately below a release button 14. One end of each of the metal segments 15 to 18 is fixed by a single fixing insulating member 19.

The first metal segment 15 is connected to the GND terminal of the circuit. The metal segments 16, 17, and 18 are respectively connected to ports P1, P2, and P3 of the controller 1 using the microcomputer.

More specifically, the ON/OFF operation between the metal segments 15 and 16 forms the half-depression switch as the first signal generation means. The ON/OFF operation between the metal segments 15 and 17 through the segment 16 forms the full-depression switch as the second signal generation means. The ON/OFF operation between the metal segments 15 and 18 through the segments 16 and 17 forms the deep-depression switch 13 as the third signal generation means.

The metal segments 15, 16, 17, and 18 themselves comprise leaf springs. In a non-operation state without depression of the release button 14, the four metal segments 15 to 18 are separated from each other, as shown in FIG. 2.

When the release button 14 is depressed, the metal segment 15 is first pressed downward to contact the metal segment 16, thereby turning on the half-depression switch 11.

When the release button 14 is further depressed (first operation), the metal segment 16 contacts the segment 17 while the metal segments 15 and 16 are kept in contact with each other, thereby turning on the full-depression switch 12.

When the release button 14 is further depressed (second operation), the metal segment 17 contacts the segment 18 while the metal segments 15, 16, and 17 are kept in contact with each other, thereby turning on the deep-depression switch 13.

If metal segments 15 to 17 having the same mechanical strength are employed, the depression forces for the switches 11, 12, and 13 increase stepwise in the order named. In this embodiment, however, a metal segment 17 having a larger thickness than other metal segments 15 and 16 is used, so that the depression force for turning on the deep-depression switch 13 can be sufficiently larger than that for turning on the full-depression switch 12. Thus, the operation of the switch 13 requires a relatively large depression force. For this reason, an erroneous operation of the release button 14 to the ON position of the switch 13 can be reliably prevented. Unless the release button 14 is strongly depressed, the switch 13 cannot be operated.

The control operation of the AF camera by the controller 1 shown in FIG. 1 will be described with reference to the flow chart shown in FIG. 3.

Assume that the mode switch 10 is switched to the focusing priority mode. In this state, when the release button is half-depressed, the ON operation of the half-depression switch 11 is determined in decision block 30. The flow advances to block 32 to turn on the AF servo, i.e., to energize the AF means constituted by the distance-measurement element 3, the focus detector 4, the lens driver 5, and the lens drive motor 6. The photographing lens 2 is moved to an in-focus position by the lens drive motor 6.

After the AF servo is energized in block 32, it is checked in decision block 34 if the full-depression switch 12 is turned on. If NO in block 34, the flow advances to decision block 46 to again check the ON state of the half-depression switch 11. If YES in block 46, the flow returns to decision block 30. In block 32, the ON state of the AF servo is maintained, and this operation is repeated.

If the full-depression switch 12 is turned on after the ON operation of the half-depression switch 11 upon depression of the release button, the flow advances from decision block 34 to decision block 36 to check if the focusing priority mode is set. In this case, since the mode switch 10 is switched in advance in the focusing priority mode, the flow advances to decision block 38 to check if a focusing signal is obtained from the focus detector 4 upon ON operation of the AF servo. If YES in block 38, the flow advances to block 42 to turn off the AF servo, i.e., to effect the AF lock. Thereafter, the shutter is driven in block 44 to perform photographing. After photographing, a series of operations such as a film wind-up operation, and the like, are performed. If it is determined in decision block 46 that the half-depression switch 11 is OFF, the flow advances to block 48 to turn off the AF servo. The flow then returns to block 30 to prepare for the next photographing operation.

If the shutter release button is further depressed from the operation position of the full-depression switch 12 to turn on the deep-depression switch 13 before the focusing signal is obtained in decision block 38, the ON operation of the deep-depression switch 13 is detected in decision block 40. The AF servo is turned off in block 42, and the flow advances to block 44 to drive the shutter.

More specifically, in the conventional focusing priority mode, unless the in-focus state is detected in step 38, the flow cannot advance to the shutter drive operation in block 44. However, in this embodiment, when the release button is further depressed from the operation position of the full-depression switch 12 to turn on the deep-depression switch 13, the photographing operation can be performed.

When the release button is depressed deeply, the photographing operation can be performed without missing a good opportunity. The focus state of the resultant photograph by this photographing operation will be better than one expected. This is because, the AF means is operated when the full-depression switch is ON until the deep-depression switch is ON, and the photographing lens is moved to the in-focus position or a position adjacent thereto.

When the photographing priority mode is selected by the mode switch 10, the same operations until decision block 34 as described above are performed. If the ON operation of the full-depression switch 12 is detected in decision block 34, the flow advances to block 42 without checking the in-focus state in decision block 38. In block 42, the AF servo is turned off to effect the AF lock, and thereafter, the shutter is driven in block 44.

Figure 3:
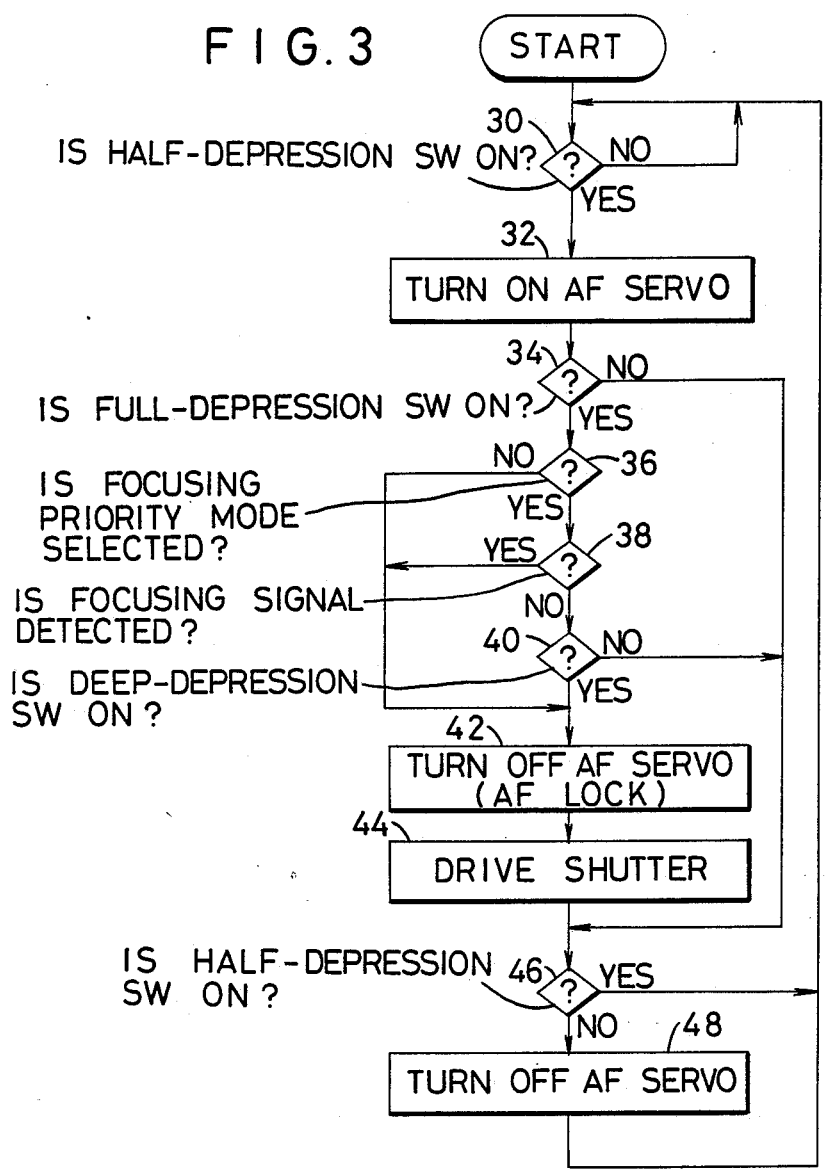
FIG. 3 is a flow chart showing a photographing operation according to the aforesaid embodiment of the present invention.

Above-described main flow of FIG. 3 is initiated by ON operation of the power switch 8 in FIG. 1 and is terminated by OFF operation of the switch 8.

Figure 4:
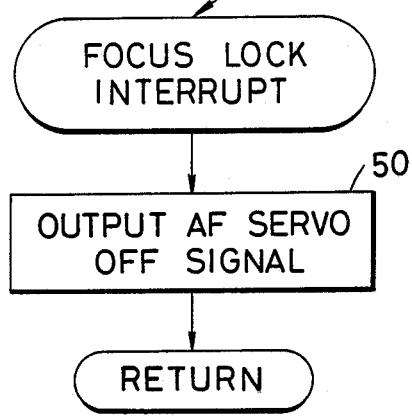
FIG. 4 is a flow chart showing interrupt processing for setting a focus lock mode.
Figure 5:
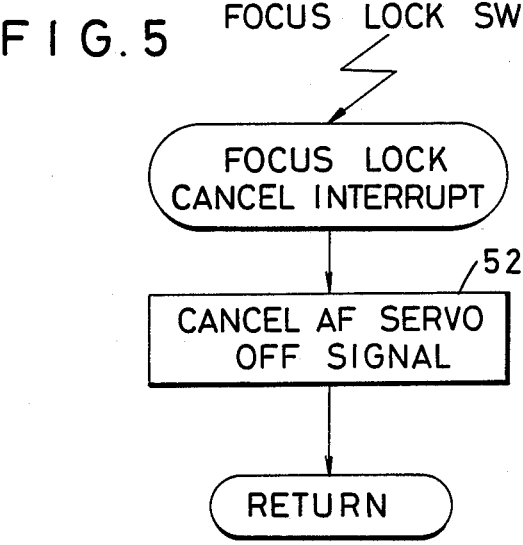
FIG. 5 is a flow chart showing interrupt processing for canceling the focus lock mode.

Focus lock interrupt processing shown in FIG. 4 and focus lock cancel interrupt processing shown in FIG. 5 are performed in the flow chart shown in FIG. 3.

More specifically, if the AF lock switch 9 is turned on during the photographing operation in which either the focusing or photographing priority mode is selected, the focus lock interrupt processing shown in FIG. 4 is executed. In block 50, an OFF signal for the AF servo is generated to leave the photographing lens in position upon operation of the switch 9, and control returns to the photographing operation shown in the flow chart of FIG. 3. With this processing, the photographing operation can be performed in a composition while an object falls outside the focusing region occupying part of a photographing frame (which is normally set at the center of the frame).

In the cancel processing, the focus lock upon operation of the AF lock switch 9 can be canceled by an AF servo OFF signal in block 52 shown in FIG. 5 when the AF lock switch 9 is turned off.

Figure 6:
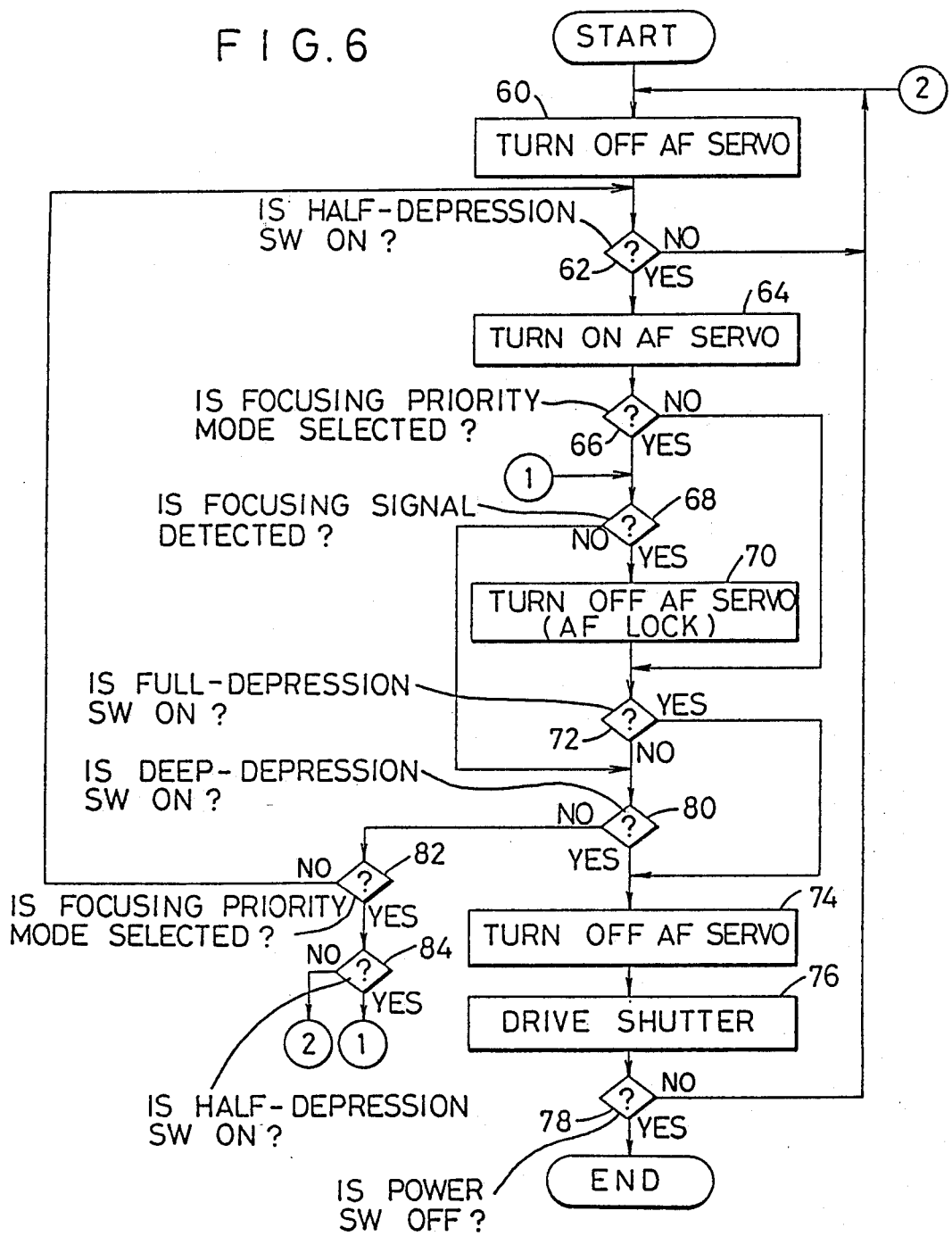
FIG. 6 is a flow chart showing a photographing operation according to another embodiment of the present invention.

FIG. 6 shows another AF control processing in the embodiment shown in FIG. 1.

In the flow chart shown in FIG. 6, when the power switch 8 is turned on, a signal for turning off the AF servo is generated in block 60. Note that immediately after the power switch 8 is turned on, since the AF servo is kept OFF, this signal is redundant. The operation state of the half-depression switch 11 is checked in decision block 62. When the half-depression switch 11 is turned on upon depression of the shutter release button, the flow advances to block 64 to energize the AF servo. It is checked in decision block 66 if the focusing priority mode is set. If this mode is selected, the flow advances to block 68 to check if the focusing signal is obtained upon energization of the AF servo. If the focusing signal is obtained, the flow advances to block 70 to turn off the AF servo, i.e., to effect the AF lock. In block 72, the operation state of the full-depression switch 12 is checked.

If the ON operation of the full-depression switch 12 is detected in decision block 72, the flow advances to block 74 to turn off the AF servo. In block 76, the shutter is driven. If it is determined in decision block 78 that the power switch 8 is not OFF, the flow returns to block 60 to prepare for the next photographing operation.

If the deep-depression switch 13 is operated before the focusing signal is obtained in decision block 68, the flow advances to block 80 to detect the ON operation of the deep-depression switch 13. After the AF servo is turned off in block 74, the shutter is immediately driven in block 76.

If no focusing signal is detected in decision block 68 and the deep-depression switch 13 is not operated, the flow advances from decision block 80 to decision block 82. In this case, since the focusing priority mode is selected, the flow advances to decision block 84 to check the ON state of the half-depression switch 11. If the switch 11 is kept ON, the flow returns to decision block 68 as indicated by connector, and the operation state of the AF servo is maintained until the focusing signal is obtained.

In the focusing priority mode, once the in-focus state is obtained, the AF lock of block 70 is in effect until the full- or deep-depression switch 12 or 13 is turned on in block 72 or 80 or the half-depression switch 11 is turned off in block 84. Therefore, a composition can be desirably determined without operating the AF lock switch 9.

Of course, if the OFF state of the half-depression switch 11 is detected in decision block 84, the flow returns to block 60 as indicated by connector to prepare for the next photographing operation.

In the photographing priority mode, this mode is detected in decision block 66, and the flow advances to decision block 72. Immediately after the full-depression switch 12 is operated, the flow advances to block 76 via block 74 to drive the shutter. The shutter drive operation can be immediately performed upon operation of the full-depression switch 12 even if no focusing signal is obtained upon operation of the AF servo.

If the ON state of the half-depression switch 11 is maintained in the photographing priority mode, the flow advances to block 82 via decision blocks 66, 72, and 80. In this case, since the photographing priority mode is selected, the flow returns to block 62 to maintain the ON state of the AF servo in block 64. In this mode, the AF operation following the movement of the object can be continued.

In the photographing operation shown in the flow chart of FIG. 6, interrupt processing for effecting and canceling the focus lock shown in FIGS. 4 and 5 can be executed upon operation of the AF lock switch 9.

In the above embodiment, the switches 11, 12, and 13 are operated in response to the half-, full-, and deep-depressions of the release button. However, the present invention is not limited to this. For example, the switch 11 may be constituted by a known touch sensor switch which is operated when a user touches the release button or a surrounding portion with a finger. In place of the independent switches 11 to 13, the following means may be adopted. More specifically, a pressure applied to the release button is detected by a pressure-sensitive element, and the applied pressure can be discriminated into three steps. Thus, upon an increase in pressure, the means generates three different signals accordingly.

In this invention, a means (corresponding to the switch 12) for generating a signal for driving a photographing system after a photographing lens reaches an in-focus position, and a means (corresponding to the switch 13) for generating a signal for immediately driving the photographing system regardless of the position of the photographing lens must be sequentially operated upon a series of two types of operations with respect to the release button. However, a means (corresponding to the switch 11) for generating a signal for energizing the AF means need not always respond to the release button.

The present invention can be applied not only to a camera using a photosensitive film but to a camera using an image pickup tube or element.

In the above embodiments, depression forces against the release button necessary for turning on the full- and deep-depression switches 12 and 13 have a difference sufficient to be easily distinguished by the feeling of the finger tip, thereby preventing erroneous operation of both the switches. More specifically, the operation of the deep-depression switch 13 is signalled to a user by depression feeling. This can be signalled to the user visually or aurally. For example, an alarm unit including a display element arranged in a finder of the camera or a sound generating element incorporated in the camera can be provided. The alarm unit is operated after the operation of the full-depression switch 12 before the operation of the deep-depression switch 13. Thus, a user can know that the deep-depression switch 13 can be operated if he depresses the release button stronger.

Figure 7:
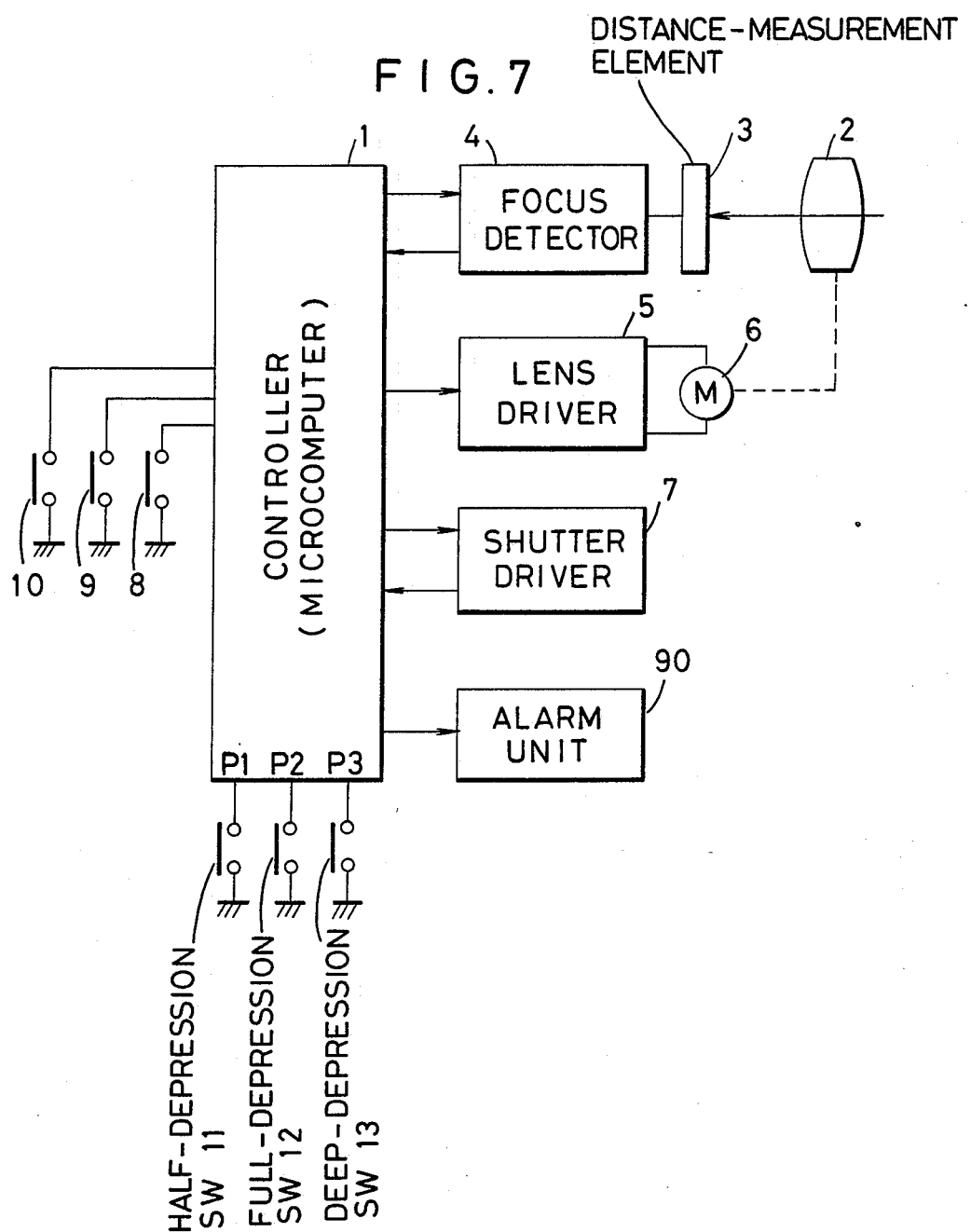
FIG. 7 is a block diagram showing an arrangement including an alarm unit according to another embodiment of the present invention.
Figure 8:
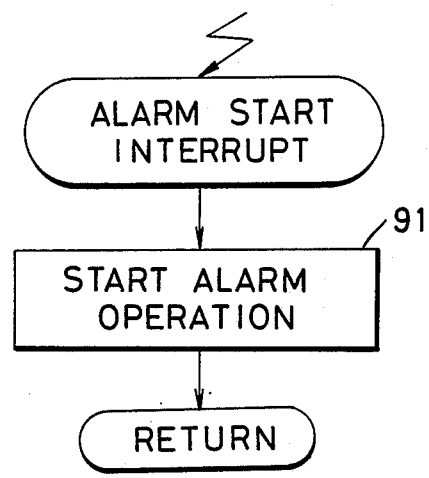
FIGS. 8 and 9 are flow charts showing interrupt processing for the alarm unit shown in FIG. 7.
Figure 9:
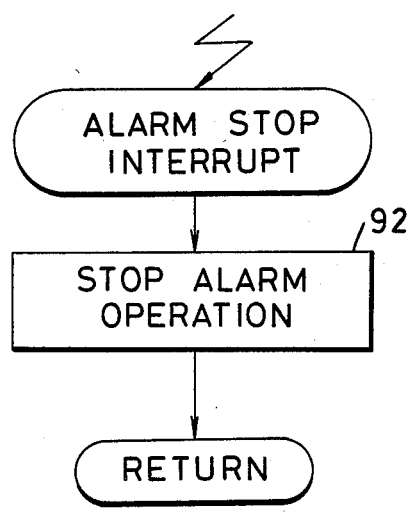

FIG. 7 is a block diagram with the above alarm unit 90. FIGS. 8 and 9 show interrupt processing for initiating and ending the operation of the alarm unit 90.

If the full-depression switch 12 is turned on during processing shown in FIG. 3 or 6, the interrupt processing shown in FIG. 8 is executed, and the display or sound generating element in the alarm unit 90 is driven in block 91. Then, control returns to the main flow shown in FIG. 3 or 6, and processing to be executed after the full-depression switch 12 is ON is resumed.

Thereafter, if the full-depression switch 12 is turned off, the interrupt processing shown in FIG. 9 is executed. The alarm unit 90 shown in FIG. 7 is turned off in block 92. Then, control returns to the main flow shown in FIG. 3 or 6, and processing to be executed after the full-depression switch 12 is OFF is resumed.

What is claimed is:

1. An automatic focusing camera having automatic focusing means for driving a photographing lens to an in-focus position with respect to an object and photographing means for photographing the object in response to operation of a release member, said camera comprising:
means for generating a focusing signal when said photographing lens is brought to the in-focus position by said automatic focusing means;
means for generating a first signal;
means for generating a second signal when said release member is subject to a first operation;
means for generating a third signal in addition to said second signal when said release member is subject to a second operation after the first operation; and
control means for controlling said automatic focusing means and said photographing means, said control means energizing said automatic focusing means during generation of said first signal, and deenergizing said automatic focusing means and energizing said photographing means when either said focusing signal or said third signal is generated when said second signal is generated, said automatic focusing means being energized until said third signal is generated if said second signal is generated and said focusing signal is not generated.

2. An automatic focusing camera according to claim 1, wherein said automatic focusing means has a focus detection area corresponding to a part of a photographing image plane and performing automatic focusing to the object in said focus detection area, and wherein said control means prohibits driving of said photographing lens by said automatic focusing means when said focusing signal is generated after the energization of said automatic focusing means upon generation of said first signal and until generation of said first signal ceases.

3. An automatic focusing camera having automatic focusing means for driving a photographing lens to an in-focus position with respect to an object and photographing means for photographing the object in response to operation of a release member, said camera comprising:
means for generating a focusing signal when said photographing lens is brought to the in-focus position by said automatic focusing means;
means for generating a first signal;
means for generating a second signal when said release member is subject to a first operation;
means for generating a third signal in addition to said second signal when said release member is subject to a second operation after the first operation;
selecting means for selecting either of automatic focusing modes of a focus priority and a photographing priority, and generating a focus priority mode signal when the focus priority mode is selected and a photographing priority mode signal when the photographing priority mode is selected; and
control means for controlling said automatic focusing means and said photographing means, said control means energizing said automatic focusing means when the first signal is generated and either said focus priority mode signal or said photographing priority mode signal is generated, deenergizing said automatic focusing means and energizing said photographing means regardless of the presence or absence of said focusing signal when said third signal is generated while said focus priority mode signal is generated, and deenergizing said automatic focusing means and energizing said photographing means regardless of the presence or absence of said focusing signal when said second signal is generated while said photographing priority mode signal is generated.

4. An automatic focusing camera according to claim 3, wherein said automatic focusing means has a focus detection area corresponding to a part of a photographing image plane and performing automatic focusing to the object in said focus detection area, and wherein said control means prohibits driving of said photographing lens by said automatic focusing means when said focusing signal is generated after the energization of said automatic focusing means upon generation of said first signal and until generation of said first signal ceases.

5. An automatic focusing camera having automatic focusing means for driving a photographing lens to an in-focus position with respect to an object and photographing means for photographing the object in response to operation of a release member, said camera comprising:

means for generating a focusing signal when said photographing lens is brought to the in-focus position by said automatic focusing means;

means for generating a first signal upon half-depression of said release member;

means for generating a second signal in addition to said first signal upon full-depression of said release member;

means for generating a third signal in addition to said first and second signals upon deep-depression of said release member; and control means for controlling said automatic focusing means and said photographing means, said control means energizing said automatic focusing means during generation of said first signal, energizing said photographing means when both of said second signal and said focusing signal are generated and deenergizing said automatic focusing means and energizing said photographing means regardless of the generation of said focusing signal when said third signal is generated, wherein said half-depression, said full-depression and said deep-depression of said release member are respectively performed by a first force, a second force and a third force, said second force being larger than said second force, the difference between said second and said third forces being larger than the difference between said first and said second forces.

6. An automatic focusing camera according to claim 5, wherein said automatic focusing means has a focus detection area corresponding to a part of a photographing image plane and performing automatic focusing to the object in said focus detection area, and wherein said control means prohibits driving of said photographing lens by said automatic focusing means when said focusing signal is generated after the energization of said automatic focusing means upon generation of said first signal and until generation of said first signal ceases.

7. An automatic focusing camera according to claim 5, further comprising warning means for performing a warning operation upon the generation of said second signal.

8. An automatic focusing camera having automatic focusing means for driving a photographing lens to an in-focus position with respect to an object and photographing means for photographing the object in response to operation of a release member, said camera comprising:

means for generating a focusing signal when said photographing lens is brought to the in-focus position by said automatic focusing means;

means for generating a first signal;

means for generating a second signal when said release member is subject to a first operation;

means for generating a third signal in addition to said second signal when said release member is subject to a second operation after the first operation;

control means for controlling said automatic focusing means and said photographing means, said control means energizing said automatic focus means during generation of said first signal, deenergizing said automatic focusing means and energizing said photographing means when both of said second signal and said focusing signal are generated and deenergizing said automatic focusing means and energizing said photographing means regardless of the generation of said focusing signal when said third signal is generated; and warning means for performing a warning operation upon the generation of said second signal.

9. An automatic focusing camera according to claim 8, wherein said automatic focusing means has a focus detection area corresponding to a part of a photographing image plane and performing automatic focusing to the object in said focus detection area, and wherein said control means prohibits driving of said photographing lens by said automatic focusing means when said focusing signal is generated after the energization of said automatic focusing means upon generation of said first signal and until generation of said first signal ceases.

10. An automatic focusing camera having automatic focusing means for driving a photographing lens to an in-focus position with respect to an object and photographing means for photographing the object in response to operation of a release member, said camera comprising:

means for generating a focusing signal when said photographing lens is brought to the in-focus position by said automatic focusing means;

means for generating a first signal upon an initial operation of said release member;

means for generating a second signal in addition to said first signal when said release member is subject to a first operation in succession of said initial operation;

means for generating a third signal in addition to said first and second signals when said release member is subject to a second operation after the first operation; and control means for controlling said automatic focusing means and said photographing means, said control means energizing said automatic focusing means during generation of said first signal, and deenergizing said automatic focusing means and energizing said photographing means when either said focusing signal or said third signal is generated when said second signal is generated; and warning means for performing a warning operation upon the generation of said second signal.

11. An automatic focusing camera having automatic focusing means for driving a photographing lens to an in-focus position with respect to an object and photographing means for photographing the object in response to operation of a release member, said camera comprising:

means for generating a focusing signal when said photographing lens is brought to the in-focus position by said automatic focusing means;

means for generating a first signal upon half-depression of said release member;

means for generating a second signal in addition to said first signal upon full-depression of said release member;

means for generating a third signal in addition to said first and second signals upon deep-depression of said release member;

selecting means for selecting either of automatic focusing modes of a focus priority and a photographing priority, and generating a focus priority mode signal when the focus priority mode is selected and generating a photographing priority mode signal when the photographing priority mode is selected; and control means for controlling said automatic focusing means and said photographing means, said control means energizing said automatic focusing means when the first signal is generated and either said focus priority mode signal or said photographing priority mode signal is generated, energizing said photographing means when both of said second signal and said focusing signal are generated, and deenergizing said automatic focusing means and energizing said photographing means regardless of the presence or absence of said focusing signal when said third signal is generated while said focus priority mode signal is generated, and deenergizing said automatic focusing means and energizing said photographing means regardless of the presence or absence of said focusing signal when said second signal is generated while said photographing priority mode signal is generated, wherein said half-depression, said full-depression and said deep-depression of said release member are respectively performed by a first force, a second force and a third force, said second force being larger than said first force and said third force being larger than said second force, the difference between said second and said third forces being larger than the difference between said first and said second forces.

* * * * *